United States Patent [19]

Fishman et al.

[11] Patent Number: 5,652,602

[45] Date of Patent: Jul. 29, 1997

[54] FAST SERIAL DATA TRANSMISSION USING A CRT

[75] Inventors: Neil S. Fishman, Bothell; Robert B. Seidensticker, Jr., Woodinville, both of Wash.

[73] Assignee: Microsoft Corporation, Redmond, Wash.

[21] Appl. No.: 437,279

[22] Filed: May 8, 1995

[51] Int. Cl.$^6$ ..................................... G09G 5/00
[52] U.S. Cl. ......................... 345/156; 345/2; 348/465; 348/473; 364/705.07
[58] Field of Search ..................... 345/156, 180, 345/2; 348/473, 465; 364/705.07, 705.01, 705.05, 705.06, 709.01, 514

[56] References Cited

U.S. PATENT DOCUMENTS

| | | | |
|---|---|---|---|
| 3,993,861 | 11/1976 | Baer | 345/156 |
| 4,534,012 | 8/1985 | Yokozawa | 364/900 |
| 4,608,601 | 8/1986 | Shreck et al. | 348/473 |
| 4,613,904 | 9/1986 | Lurie | 348/473 |
| 4,956,639 | 9/1990 | Uemura et al. | 345/180 |
| 4,999,617 | 3/1991 | Uemura et al. | |
| 5,488,571 | 1/1996 | Jacobs et al. | 364/705.07 |
| 5,535,147 | 7/1996 | Jacobs et al. | 364/705.07 |

FOREIGN PATENT DOCUMENTS

| | | | |
|---|---|---|---|
| 2311996 | 12/1990 | Japan | 345/156 |

Primary Examiner—Richard Hjerpe
Assistant Examiner—Kent Chang
Attorney, Agent, or Firm—Lee & Hayes, PLLC

[57] ABSTRACT

Disclosed herein is a system and method of serially transferring a sequence of data bits between a computer and a portable information device such as the Timex Data Link™ watch, using the CRT of the computer as a transmission medium. The computer is programmed to display sequential display frames on a frame-scanning graphics display device and to illuminate line segments within the display frames to represent individual data bits. Each line segment has a continuous length on the display device which produces an optical pulse of a corresponding duration. Each data bit is encoded as a different line segment length to produce an optical pulse for each data bit having a duration which is dependent on the value of the data bit. For example, a pulse representing a binary value of 0 has a duration which is relatively longer than that of a pulse representing a binary 1. A receiving device monitors the optical signal created by the CRT and detects rising signal edges. It interprets each rising edge as the beginning of a single bit. After detecting a rising edge, the receiving device waits for a pre-determined time and then samples the optical signal. If the pulse from the CRT is still present, the receiving device interprets the data bit as a binary 0. Otherwise, the receiving device interprets the data bit as a binary 1.

29 Claims, 11 Drawing Sheets

FAST SERIAL DATA TRANSMISSION USING A CRT

TECHNICAL FIELD

This invention relates to systems and methods for transferring a binary data stream from a personal computer to a portable information device using the CRT of the personal computer.

BACKGROUND OF THE INVENTION

In recent years, there has been an increasing use of compact, pocket-size electronic personal organizers that store personal scheduling information such as appointments, tasks, phone numbers, flight schedules, alarms, birthdays, and anniversaries. Some of the more common electronic organizers are akin to hand-held calculators. They have a full input keyboard with both numeric keys and alphabet keys, as well as special function keys. The organizers also have a liquid crystal display (LCD) which often displays full sentences and rudimentary graphics.

Pocket-size personal organizers prove most useful to busy individuals who are frequently traveling or always on the move from one meeting to the next appointment. Unfortunately, due to their hectic schedules, these individuals are the people most likely to forget their personal organizers during the frantic rush to gather documents, files, laptops, cellular phones, and travel tickets before heading off to the airport or train depot. It would be desirable to reduce the number of electronic devices that these individuals need to remember for each outing.

Electronic watches have evolved to the point that they can function as personal organizers. Like the pocket-size devices described above, such watches can be programmed with certain key appointments, tasks, phone numbers, flight schedules, alarms, birthdays, and anniversaries. Since watches are part of everyday fashion attire, they are more convenient to carry and less likely to be forgotten by busy people. However, it is much more difficult to enter data into a watch than it is to enter the same data into a pocket-size personal organizer. This difficulty is due in large part to the limited number of input buttons and display characters available on reasonably-sized watches. Most watches are limited to having only three or four input buttons. A wearer programs a watch by depressing one or more buttons several times to cycle through various menu options. Once an option is selected, the user depresses another button or buttons to input the desired information. These input techniques are inconvenient and difficult to remember. Such techniques are particularly inconvenient when a wearer wishes to enter an entire month's schedule. Although watches have been made with larger numbers of input keys, such watches are usually much too large for comfort, and tend to be particularly unattractive.

Apart from personal organizers, it is common for many people to maintain appointment calendars and task lists on their personal computers. One example time management software is Microsoft's® Schedule+™ for Windows™ which maintains daily appointment schedules, to-do lists, personal notes, and calendar planning. This information is often a duplicate of that maintained on the portable personal organizer.

Timex Corporation of Middlebury, Conn., has recently introduced the Timex® Data Link™ watch. This watch utilizes new technology for transferring information from a personal computer to a watch. The face of the watch has an optical sensor which is connected to a digital serial receiver, better known as a UART (universal asynchronous receiver/transmitter). The watch expects to receive a serial bit transmission in the form of light pulses at a fixed bit rate. A pulse represents a binary '0' bit, and the absence of a pulse represents a binary '1' bit.

The CRT (cathode ray tube) or other scanned-pixel display of a personal or desktop computer is normally used to provide light pulses to the watch. Although it appears to a human viewer that all pixels of a CRT are illuminated simultaneously, the pixels are actually illuminated individually, one at a time, by an electron beam which sequentially scans each row or raster line of pixels beginning with the top raster line and ending with the bottom raster line. It is this characteristic of a CRT and of other frame-scanning display devices which is utilized to transmit serial data to the Data Link™ watch.

To transfer data to the watch, the watch is held near and facing the CRT. The computer is programmed to display a sequence of display frames in which selected spaced raster lines represent individual bits of data. Lines are illuminated or not illuminated, depending on whether they represent binary '0' bits or binary '1' bits. Each line appears as a continuous pulse of a finite duration to the receiving watch. The watch recognizes an illuminated line as a binary '0' bit. It recognizes a non-illuminated line as a binary '1' bit. Generally, ten bits are transmitted in a single CRT display frame: eight data bits, a start bit, and a stop bit. A display frame is generally created by sequentially illuminating or refreshing the raster lines of the display device.

Figure 1:
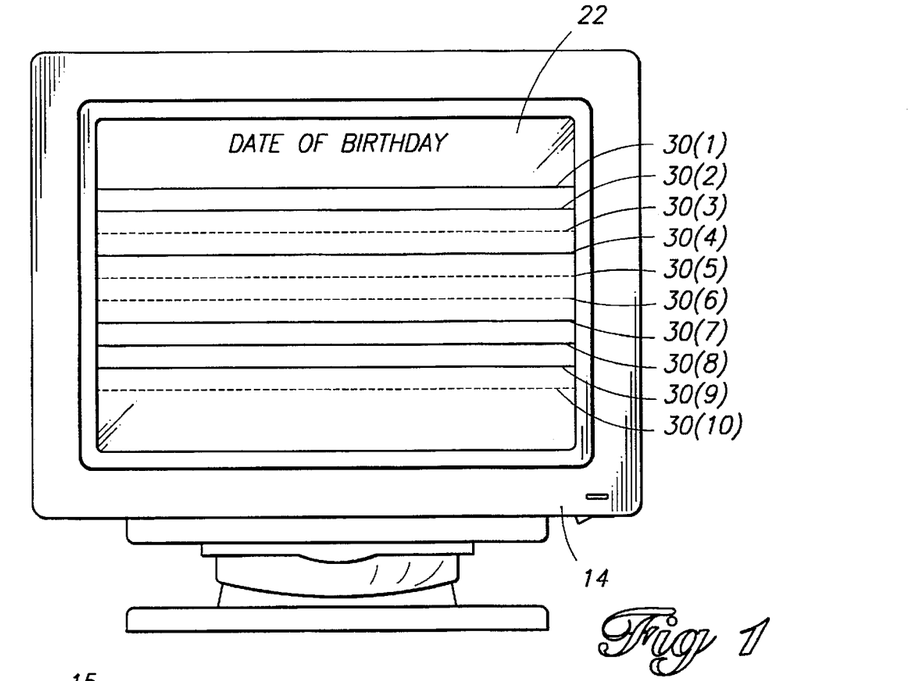
FIG. 1 is diagrammatic front view of a CRT monitor depicting a display frame having contiguously-scanned lines used to convey bits of information to a programmable watch.

FIG. 1 shows a specific pattern of selected and spaced raster lines used to transmit data from a CRT to a watch. Assuming that each CRT display frame transmits a single 8-bit byte with start and stop bits, ten raster lines 30(1)–30(10) (out of a much larger total number of available raster lines) are selected for transmitting data. These raster lines will be referred to herein as "data transmission raster lines," as opposed to other, intervening raster lines which will be referred to as "unused raster lines." Solid lines in FIG. 1 represent data transmission raster lines which are illuminated. Dashed raster lines in FIG. 1 represent data transmission raster lines which are not illuminated. Each data transmission raster line position conveys one data bit of information. Bits having a first binary value, such as a value '0', are represented by illuminated data transmission lines (e.g., lines 30(1), 30(2), 30(4), and 30(7)–30(9)) and bits having a second binary value, such as a value '1', are represented by non-illuminated data transmission lines (as illustrated pictorially by the dashed lines 30(3), 30(5), 30(6), and 30(10)). The data transmission raster lines are spaced at a selected intervals, with intervening unused or non-selected raster lines, to produce a desired temporal spacing appropriate for the data receiving electronics of the watch.

For each programming instruction or data to be transmitted to the watch, the software resident in a personal computer causes the associated CRT to selectively illuminate the appropriate data transmission raster lines representing '0' bits by scanning the associated pixels. The selected data transmission lines that represent '1' bits are left non-illuminated. The middle eight lines 30(2)–30(9) represent one byte of programming information being optically transmitted to the watch 12. Top line 30(1) represents a start bit and bottom line 30(10) represents a stop bit that are used for timing and error detection. Because of the scanning nature of the cathode ray of the CRT, these patterns produce a serial light emission from the CRT which is representative of a serial bit stream. Each display frame represents one byte. A new line grouping is presented for each sequential display frame so that each such display frame represents a different data byte. Two or more bytes could optionally be transmitted in each display frame.

One disadvantage of the system described above is that the Data Link™ watch expects to receive data at a very specific bit rate of 2048 bits per second. This is accomplished by correctly establishing the spacing of data transmission raster lines used on the display device for data transmission. The spacing can be controlled by varying the number of unused raster lines between the data transmission raster lines. The correct spacing, however, depends on the rate at which the display device scans or updates its pixels and raster lines. Not all display devices use the same scanning rate. Accordingly, manual or automatic calibration routines are needed to determine or measure the scan rate of the display device. Unfortunately, such routines are sometimes difficult to implement. This is especially the case when operating under multi-tasking operating systems such as Microsoft's Windows® '95 operating system. An operating system such as Windows® '95 discourages close interaction between application programs and computer hardware, making direct measurement of a CRT's scan frequency very difficult.

SUMMARY OF THE INVENTION

The invention described below eliminates this problem by using an optical transmission format which is not dependent upon fixed inter-bit spacing. Each bit is transmitted as an optical pulse having either a short duration or a long duration. The rising edge of the optical pulse allows the receiving watch to detect the transmission of each bit. After detecting the rising edge, the watch samples the optical signal after waiting a pre-determined time. If the optical pulse is still present, the watch interprets or decodes the pulse as a first value such as 0. If the optical pulse is not still present, the watch interprets or decodes the pulse as a second value such as 1. After interpreting each pulse, the watch waits for the next rising edge and then repeats the process to interpret or decode the next bit.

BRIEF DESCRIPTION OF THE DRAWINGS

FIG. 3 is a simplified block diagram of a computer such as shown in FIG. 2.

DETAILED DESCRIPTION OF THE PREFERRED EMBODIMENT

Figure 2:
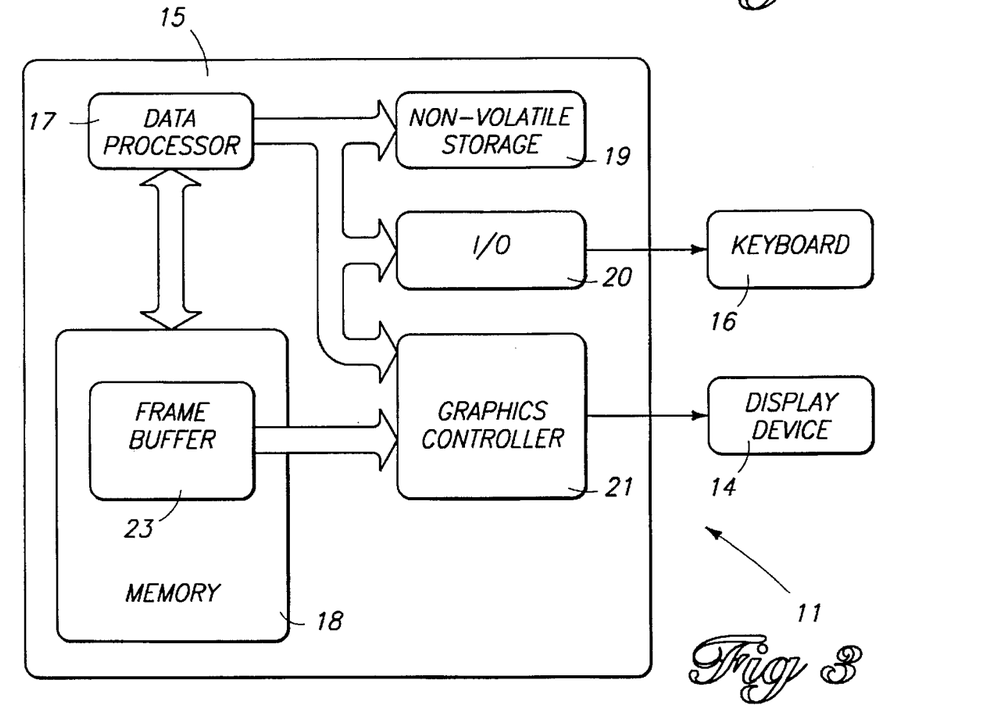
FIG. 2 is a diagrammatic illustration of a system for serially transferring a sequence of data units to a portable information device in accordance with the invention.

FIG. 2 shows a system 10 in accordance with a preferred embodiment of the invention for serially transferring a sequence of data units to a portable information device. The term "data unit" as used herein refers to a unit of information having one of a plurality of possible values. A binary bit is an example of a commonly used data bit having two possible values.

System 10 includes a computer or computer system 11 and a portable or external information receiving device in the form of programmable Data Link™ watch 12. Computer 11 includes a frame or raster scanning graphics display device 14, a central processing unit (CPU) 15 having a data processor, memory, and I/O components, and a keyboard 16 (or other input device).

Visual display device 14 is a CRT (cathode ray tube) monitor such as commonly used in personal desktop computers. The graphics display device displays sequential display frames containing graphical images on its monitor screen 22. A "display frame" or "frame" means a single, two-dimensional, screen-size image made up of a matrix of pixels. The pixels form a plurality of available raster lines for each display frame.

The individual pixels and raster lines of a CRT are illuminated individually by an electron beam (i.e., the cathode ray) which sequentially scans each raster line beginning with the top raster line and ending with the bottom raster line. The beam is deflected horizontally (in the line direction) and vertically (in the field direction) to scan an area of the screen to produce a single display frame. The electron beam strikes phosphors positioned at the screen of the CRT monitor to cause them to glow. The phosphors are arranged according to a desired pixel pattern, which is customarily a matrix of rows and columns. Conventional color monitors typically have a resolution of 640×480 pixels. The process of scanning all raster lines a single time and returning the electron beam from the bottom to the top of the display is referred to as a "frame scan." Display devices such as this scan their raster lines at a frequency referred to herein as a frame-scanning frequency which varies from model to model of CRT.

FIG. 3 shows pertinent internal components of CPU 15. CPU 15 includes a programmable data processor 17, volatile or DRAM memory 18, non-volatile storage 19 such as a hard disk, I/O components 20 such as serial, parallel, and keyboard ports, and a graphics controller 21. The configuration and features of CPU 15 are typical of popular personal computers. In general, the components of computer 11 form the means for performing the data transmission steps described below. The various graphics-related components of computer 11 form the means for displaying sequential display frames on the CRT.

The matrix of display frame pixels displayed on display device 14 is specified by a corresponding matrix of data values stored within memory 18 of CPU 15. The specific area of memory 18 designated for storing pixel information is referred to as a frame buffer, and is referenced in FIG. 3 by the numeral 23. Frame buffer 23 is associated with the frame-scanning graphics display device. It has individual pixel storage locations corresponding respectively to individual display frame pixels. Graphics controller 21 reads pixel information from frame buffer 23 during each CRT frame scan to determine the color and intensity of each display frame pixel. Data processor 17 writes to frame buffer 23 to display desired or specified patterns on CRT 14.

The linear scanning electron beam of CRT 14 is utilized to transfer a binary data stream or sequence of data units between computer 11 and watch 12. Specifically, computer 11 uses selected raster lines of CRT 14 for serial bit transmission to watch 12. Application software loaded in CPU 15 generates a sequence of display frames having changing patterns of raster lines that are displayed on CRT 14. The lines appear at watch 12 as a series of optical pulses. Watch 12, through optical sensor 13, monitors the illumination of the raster lines of the sequential display frames to reconstruct the transmitted data.

Figure 4:
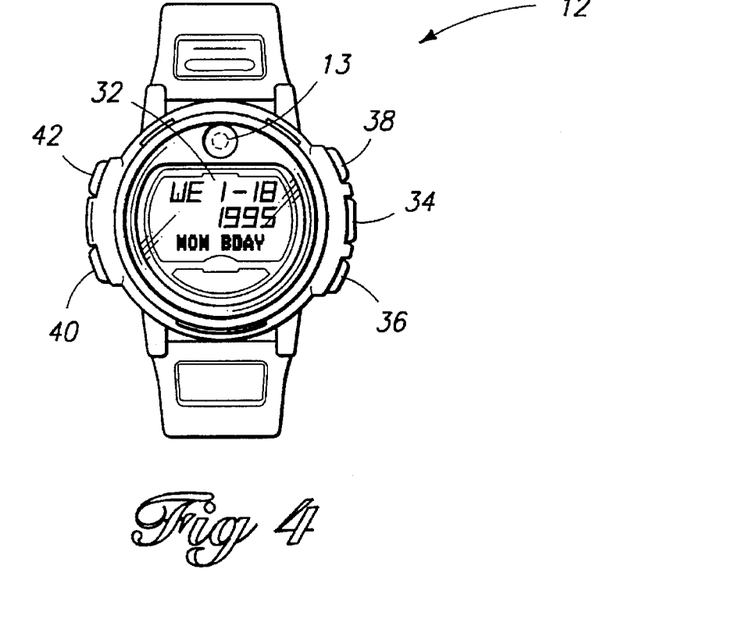
FIG. 4 is a diagrammatic front view of a programmable watch such as shown in FIG. 2.

FIG. 4 shows an external face of programmable watch 12, which is illustrated for discussion proposes as the Timex® Data Link™ watch. Other watch constructions as well as other portable information devices can be used in the context of this invention. Watch 12 includes a small display 32 (such as an LCD), a mode select button 34, a set/delete button 36, next/previous programming buttons 38 and 40, and a display light button 42. Optical sensor 13 is positioned adjacent to display 32. In the programming mode, display 32 indicates the programming option, and what data is being entered therein. During the normal operational mode, display 32 shows time of day, day of week, or any other function common to watches.

While the invention is described herein within the context of a programmable watch, other portable information devices can be used such as pagers and personal digital assistants. As used herein, "portable information device" means a small, portable, electronic apparatus that has limited power resources and limited rewritable memory capacity. The Data Link™ watch, for example, is presently constructed with a rewritable memory capacity of approximately 1 Kbyte.

Figure 5:
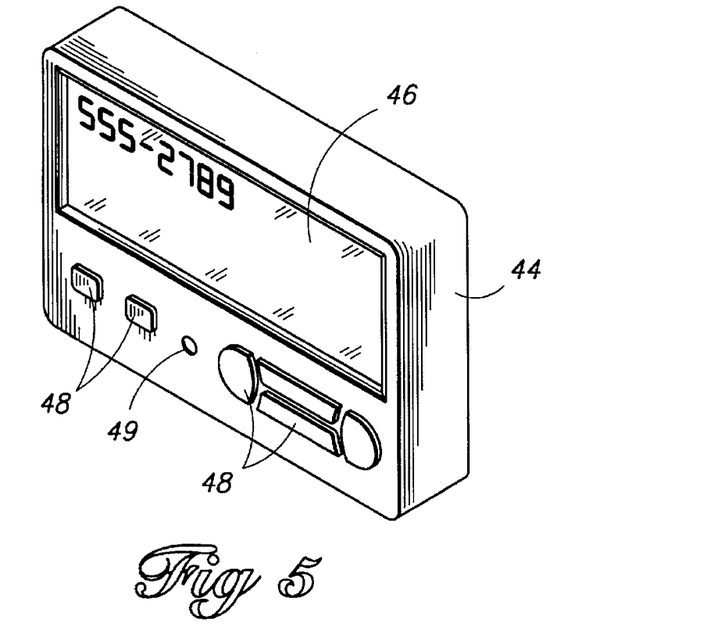
FIG. 5 is a diagrammatic front view of a personal digital assistant such as might be used in conjunction with the invention.

As an example of another form of portable information device, FIG. 5 shows a pager or personal digital assistant (PDA) 44. PDA 44 has an LCD 46, a keypad 48 for entering data, and an optical sensor 49. Like watch 12, PDA 44 can be optically programmed from a visual display device, such as a scanned-pixel monitor. For description purposes, the invention continues to be described in the context of the watch embodiment.

Figure 6:
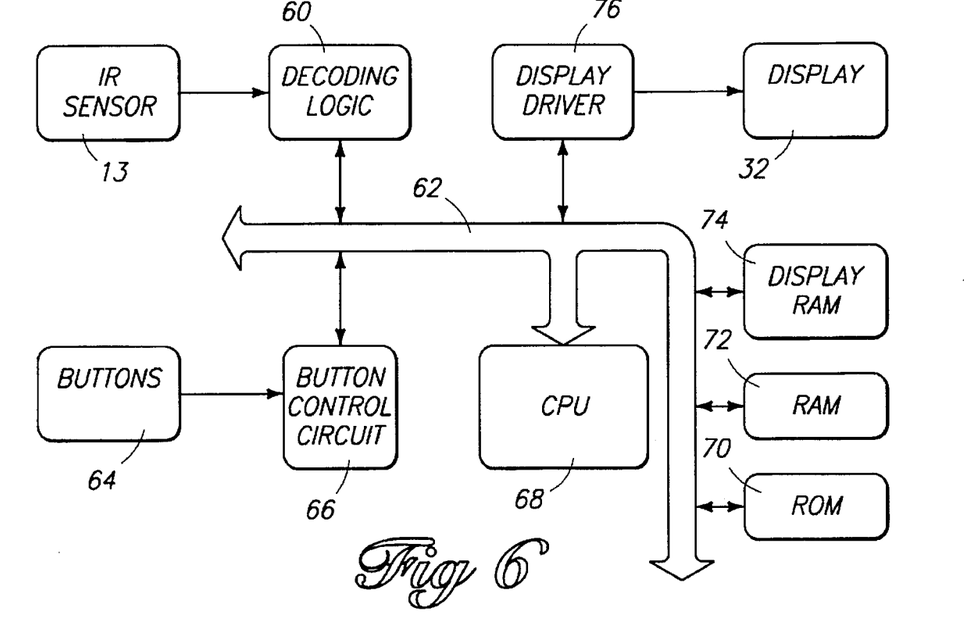
FIG. 6 is a simplified block diagram of the internal components of the programmable watch of FIG. 4.

Referring now to FIG. 6, watch 12 includes a CPU (Central Processing Unit) 68 for performing data processing tasks, a ROM (Read Only Memory) 70 for storing initial power-up programs and other identification information, and a RAM (Random Access Memory) 72 for data storage. ROM 70 has an example capacity of approximately 16 Kbytes, while RAM 72 has an example capacity of 1 Kbyte. A display RAM 74 is provided to temporarily store data used by display driver 76 to depict visual information on display 32. These components can be incorporated into a single microprocessor-based integrated circuit. One appropriate microprocessor IC is available from Motorola Corporation as model MC68HC05HG.

Watch 12 has an optical or IR sensor 13 which is coupled to internal serial decoding logic 60. In the prior art Data Link™ watch, this logic would have consisted of a digital serial receiver or UART. In the preferred embodiment of the invention, however, such a conventional UART is replaced or augmented by other components which will be described below.

To program the watch, the computer is first loaded with compatible time management software and optical pattern generating software. One example time management software is Microsoft's® Schedule+™ for Windows™ and a suitable optical pattern generating software is Timex® Data Link™ communications software. The user selects a desired option from a menu of choices displayed on the monitor in a human-intelligible form. For instance, suppose the user wants to enter his/her appointments and tasks for the month of January, including a reminder for his/her mother's birthday on Jan. 18, 1995. The user inputs the scheduling information on the computer using a keyboard and/or mouse input device. The user then sets the watch to a programming mode using control buttons 34–40 and holds optical sensor 13 in juxtaposition with monitor screen 22. A sequence of changing optical patterns having horizontal contiguously-scanned lines begin to flash across the monitor screen as shown in FIG. 1 to optically transmit data regarding the various appointments and tasks. In about 20 seconds, the system will have transmitted as many as 70 entries, including the birthday reminder. These entries are kept in data RAM 72.

Figure 7:
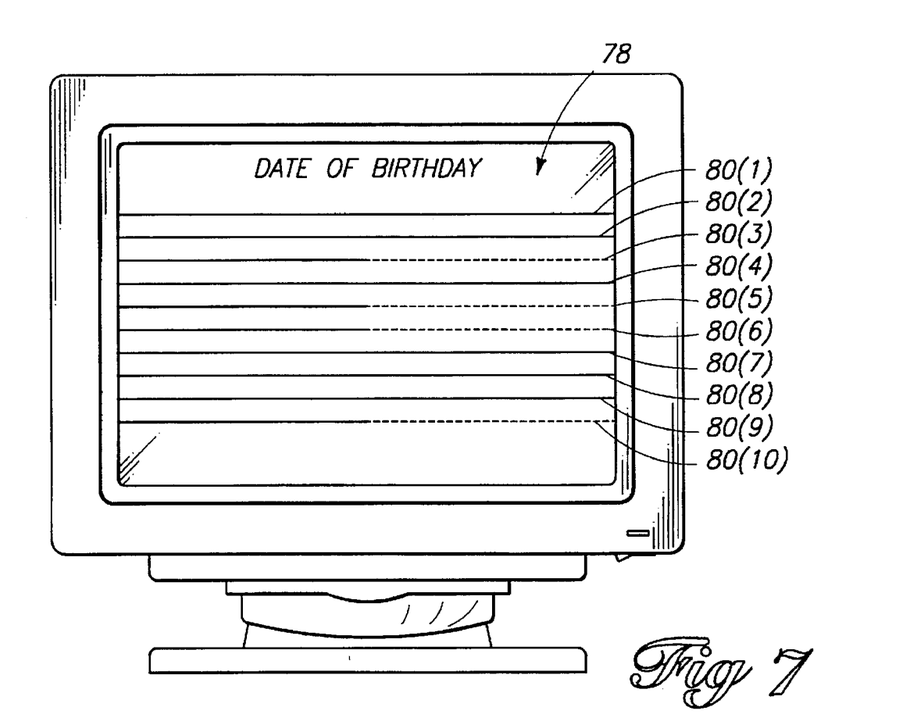
FIG. 7 is a diagrammatic front view of a CRT monitor depicting a display frame have data transmission lines formatted in accordance with a preferred embodiment of the invention.

FIG. 7 shows an optical pattern 78 in accordance with the invention for transmitting a single byte of information similar to the byte of information shown in the prior art example of FIG. 1. The optical pattern comprises a series of selected and spaced data transmission lines 80(1) through 80(10) corresponding respectively to the bits to be transmitted. Unused raster lines (not shown) optionally intervene between data transmission lines 80(1) through 80(10). In FIG. 7, illuminated portions of the data transmission lines are shown as solid lines, while non-illuminated portions are shown as dashed lines. In contrast to the prior art, each of data transmission lines 80 is at least partially illuminated. More specifically, at least a leading portion of each data transmission line 80 is illuminated. This creates a leading optical signal edge corresponding to each data bit. A trailing portion of each data transmission is illuminated or not, depending on the value of the corresponding data bit.

Figure 8:
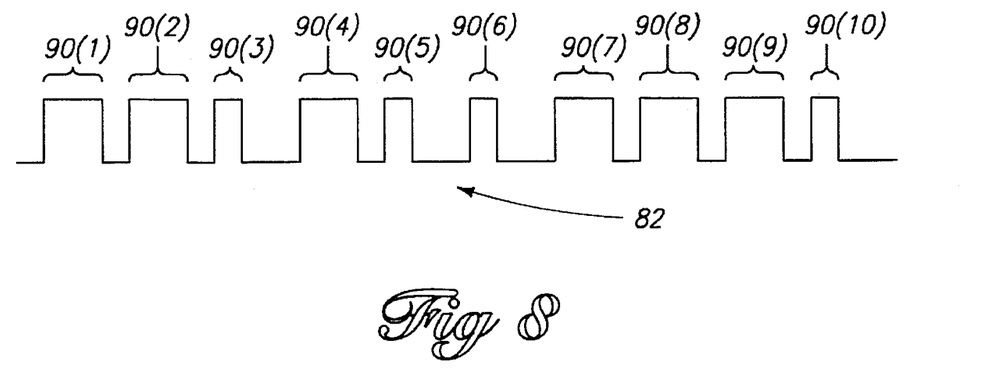
FIG. 8 is a timing diagram showing optical pulses as created by the CRT display frame of FIG. 7.

An optical signal 82, resulting from the optical pattern of FIG. 7, is shown in FIG. 8. Signal 82 consists of an optical pulse 90 corresponding to each transmitted bit. The optical pulses are designated 90(1) through 90(10), corresponding to data transmission lines 80(1) through 80(10) of FIG. 7. To differentiate pulses representing binary 0's from pulses representing binary 1's, each possible binary value is encoded as a different pulse length. In other words, each pulse has a duration which is dependent on the value of its corresponding bit. In the preferred embodiment, pulses corresponding to binary 1 bits have a relatively short duration, while pulses corresponding to binary 0 bits have a relatively long duration. This coding could of course be reversed so that short pulses would correspond to binary 0 bits and long pulses would correspond to binary 1 bits.

With specific reference to FIGS. 7 and 8, the first pulse represents a start bit having a binary value of 0. It is represented in FIG. 8 by pulse 90(1). A relatively long pulse such as this is created as shown in FIG. 7 by illuminating a relatively long portion of raster line 80(1). Pulse 90(2) also represents a zero and is thus identical to pulse 90(1). Notice that regardless of the value of the represented bits, the pulses are separated by a trailing low portion so that the next pulse can create a discrete leading edge. The third pulse 90(3) represents a binary 1. Thus, pulse 90(3) is shorter than the previous pulses. A pulse such as this is created as shown in FIG. 7 by illuminating only a relatively short portion of raster line 80(3). The remaining optical bit pulses are similar, depending on whether they represent '0' or '1' bits.

This transmission scheme removes the prior art requirement of a fixed bit rate which in turn required knowledge of the CRT's scanning frequency. Although FIGS. 7 and 8 show a regular bit rate, with each bit occurring at the same interval from the previous bit, this is not necessary. Each bit can actually be separated from the preceding bit by an arbitrary and different interval, resulting in a totally asynchronous bit stream. Using the transmission scheme of the invention, a receiving device can determine the timing of transmitted bits by simply detecting rising edges of a received optical signal. The receiving device must be configured to delay a pre-defined time after each rising edge, and to then sample the optical signal. The state of the optical signal after this delay indicates whether the bit corresponding to the pulse has a 0 or 1 value. Even though the bit rate can be asynchronous, it may be desirable in some instances to send bits at regular intervals to reduce the required frequency of signal sampling by the receiving device.

Figure 9:
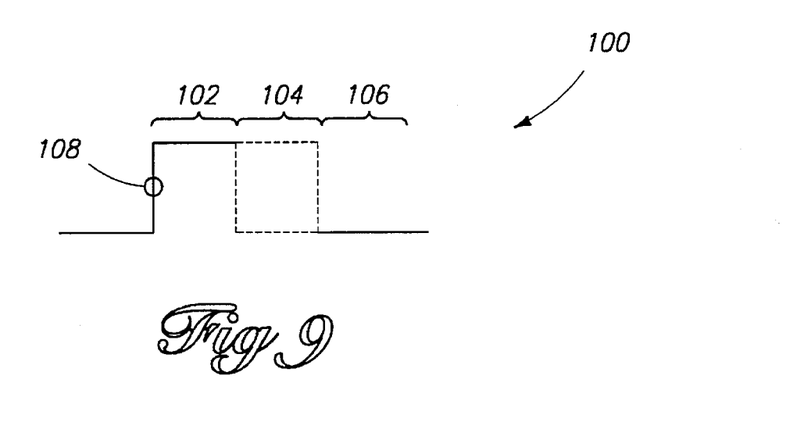
FIG. 9 is a timing diagram illustrating the formation of a single optical pulse in accordance with the invention.

FIG. 9 shows a generalized representation of a single optical pulse 100 in accordance with the invention. Pulse 100 corresponds to a single bit having one of two possible values: 0 or 1. The potential period of optical pulse 100 is divided into three portions: a leading or timing portion 102, an intermediate or data-indicating portion 104, and a trailing portion 106. Timing portion 102 is always high to create a leading signal edge 108. Data-indicating portion 104 is either high or low, depending on whether the corresponding bit has a value of 0 or 1. For example, if the pulse represents a '0' bit, data-indicating portion 104 is high. If the pulse represents a '1' bit, data-indicating portion 104 is low. Trailing portion 106 is always low to provide a demarcation between pulses. In other words, the optical signal returns to a low value prior every pulse. In many cases, the trailing portion corresponds to the horizontal refresh period of the CRT, during which the electron beam of the CRT is off as it moves from the end of one line to the beginning of the next.

Using the scheme described above, it is not necessary to dedicate an entire raster line of a CRT for each data bit. For example, two or more pulses can be created on a single raster line of a CRT, separated from each other by an intervening portion of the raster line which is not illuminated.

Figure 10:
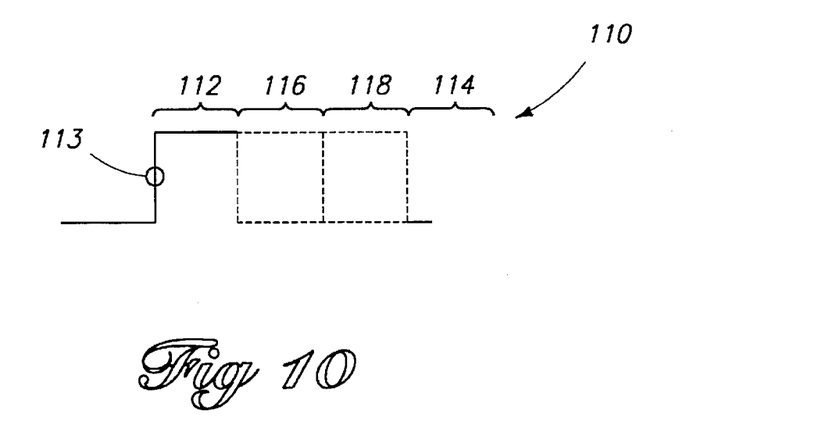
FIG. 10 is a timing diagram similar to that of FIG. 9, showing formation of an alternative optical pulse in accordance with the invention.

It is furthermore possible to represent data units having more than two possible values with a single pulse. FIG. 10 shows an optical pulse 110 which represents a data unit having three possible values. Optical pulse 110 has a leading portion 112 which is always high to create a rising signal edge 113. Portion 112 needs to be of sufficient duration to differentiate it from any possible noise in the optical pulse. This is eventually followed by a trailing portion 114 which is always low to terminate the optical pulse and to provide a demarcation from the next optical pulse. The potential period of optical pulse 110 includes first and second intermediate portions 116 and 118. A receiving device is configured to wait for the rising edge and then sample the optical signal at first and second times after the rising edge, wherein the first and second times correspond to the first and second intermediate or data-indicating portions 116 and 118. There are three possible signal patterns for signal 110: (a) the signal returns low after leading portion 112 and before first intermediate portion 116; (b) the signal returns low between first and second intermediate portions 116 and 118; and (c) the signal returns low only after second intermediate portion 118. This possible patterns correspond to first, second, and third values of a data unit. This scheme can be extended to encode any number of data values.

Figure 11:
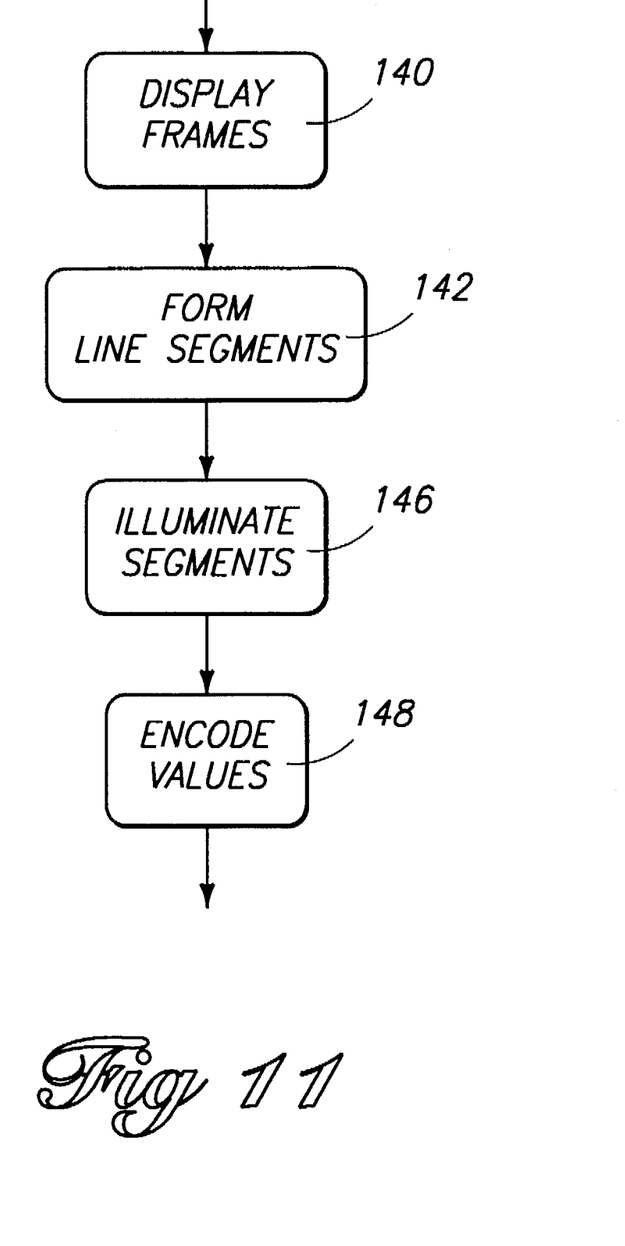
FIG. 11 is a flow diagram showing preferred methodical steps of transmitting data units in accordance with the invention.

FIG. 11 shows preferred methodical steps implemented by computer 10 in accordance with the invention for serially transferring a sequence of data units to a portable information device such as watch 12, wherein each data unit has one of a plurality of possible values. Block 140 indicates a step of displaying sequential display frames on frame-scanning graphics display device 14. In the preferred form of the invention, a plurality of data units or bits are transmitted during each display frame. Each bit is represented by an individual line segment which, in turn, creates an individual optical pulse. Accordingly, block 142 indicates a step of forming or identifying a plurality of line segments from among the available raster lines of CRT 14, wherein the individual line segments correspond respectively to individual data bits.

A subsequent step 146 comprises illuminating variable-length portions of the line segments. As a result of this step, each illuminated line segment will have a continuous illuminated length on the display device which produces an optical pulse of a corresponding duration. This duration will depend on the scanning frequency of CRT 14. A step 148 comprises encoding each possible data unit value as a different line segment length to produce an optical pulse for each data unit having a duration which is dependent on the value of the data unit. For example, a data unit having a first value such as 1 would have a relatively short duration, while a data unit having a second value such as 0 might have a relatively longer duration. A third data unit value could be represented by a pulse of an even longer duration. These steps are repeated for each data unit or bit to be transmitted.

Figure 12:
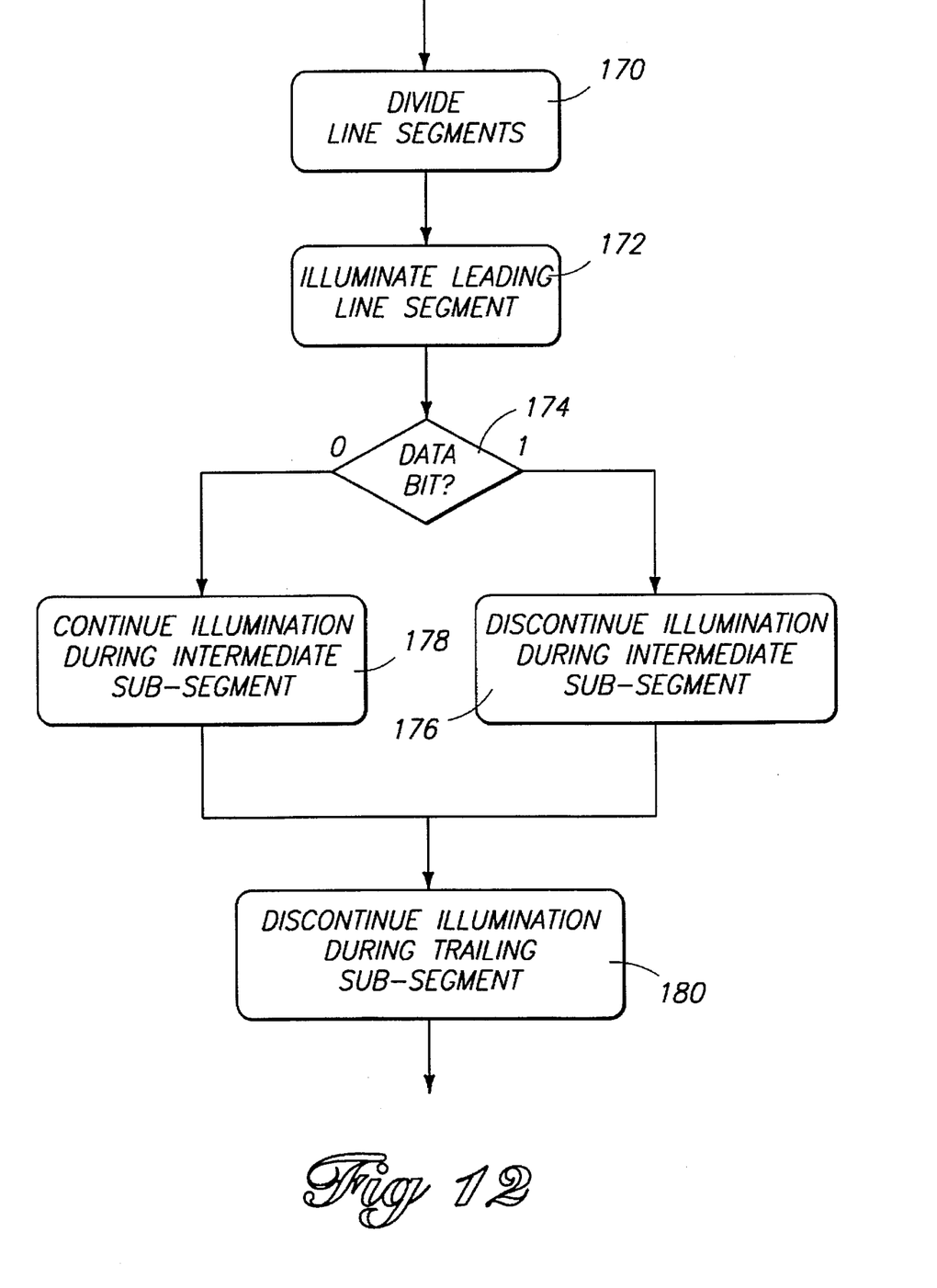
FIG. 12 is a flow diagram showing more detailed methodical steps of transmitting data units in accordance with the invention.
Figure 13:
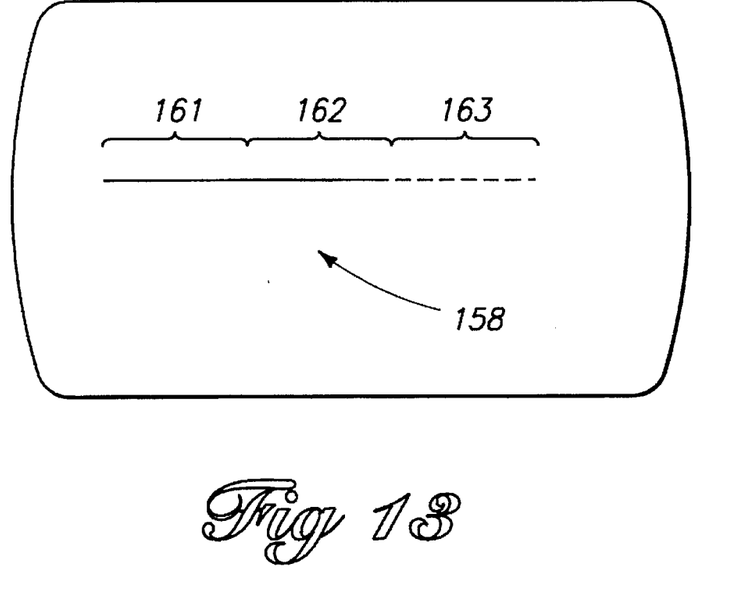
FIG. 13 is a diagrammatic view of a CRT line segment created in accordance with a preferred embodiment of the invention.

FIG. 12 shows more detailed steps of creating a line segment on CRT 14 to create an optical pulse of an appropriate length for transmitting a binary 0 or 1. A line segment 158 as created by the steps of FIG. 12 is shown in FIG. 13. A first step 170 comprises dividing each line segment into at least first and second sub-segments 161 and 162, and preferably also into a trailing sub-segment 163. The first and second sub-segments are alternatively referred to herein as leading and intermediate sub-segments, respectively. Step 172 comprises illuminating at least the first or leading sub-segment 161 of each line segment to produce an optical pulse of a minimum duration, having a rising edge. In block 174, a determination is made relative to the value to be represented by the optical pulse. In one case, where the pulse is to represent a data unit having a first value such as binary 1, a step 176 is executed of discontinuing the illumination of the line segment during its second or intermediate sub-segment 162. In the other case, where the pulse is to represent a data unit having a second value such as binary 0, a step 178 is executed of continuing to illuminate the line segment during or through its second or intermediate sub-segment 162. In either case, regardless of the value of the data unit to be transmitted, the illumination is discontinued after the intermediate sub-segment, during trailing sub-segment 163, as indicated by execution block 180 in FIG. 12. For purposes of illustration in FIG. 13, intermediate sub-segment 162 is shown as being illuminated.

Figure 14:
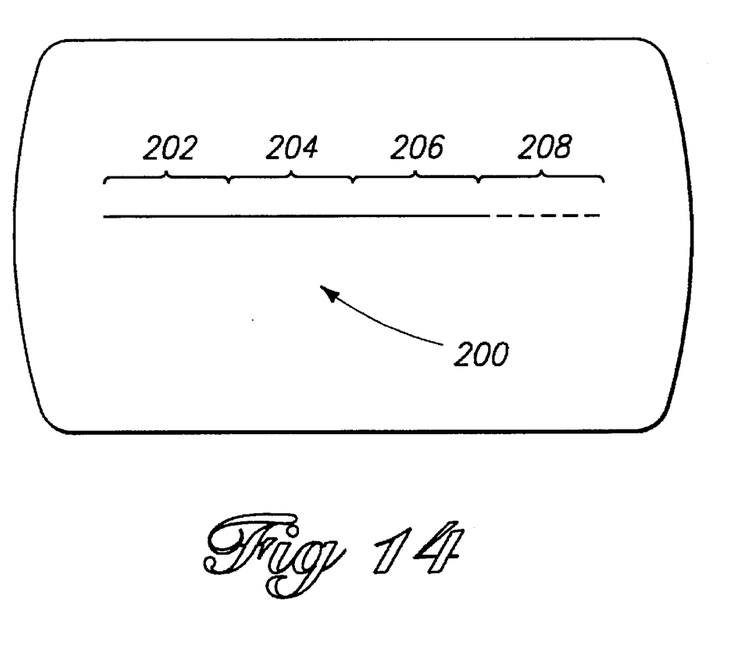
FIG. 14 is a diagrammatic view of another CRT line segment created in accordance with an alternative embodiment of the invention.

As discussed above, these methods can also be used to create data pulses representing data units having more than two possible data values. FIG. 14 shows a line segment 200 which produces an optical pulse capable of indicating three different data unit values. In accordance with this aspect of the invention, line segment 200 is divided into a leading sub-segment 202, at least first and second intermediate sub-segments 204 and 206, and a trailing sub-segment 208. If the corresponding data unit has a first of the possible values, such as zero, the illumination of the line segment is discontinued during both of the intermediate sub-segments 204 and 206, immediately after leading sub-segment 202. If the data unit has a second of the possible values, such as perhaps one, the illumination of the line segment is continued during first intermediate sub-segment 204, but discontinued during second intermediate sub-segment 206. If the data unit has neither the first or the second of the possible values, illumination of the line segment is continued during both first and second intermediate sub-segments 204 and 206. In all cases, the illumination is discontinued prior to or during trailing sub-segment 208. Note again that the trailing sub-segment might in some cases be formed by the horizontal retrace period of CRT 14.

These methods can be extended by providing even more than two intermediate sub-segments to represent data unit values having even more than three possible values. For instance, using three intermediate sub-segments would allow representation of four possible data unit values, such as zero through three. In general, n possible data unit values can be represented by using n-1 intermediate sub-segments.

One problem or complication introduced by the above scheme relates to the variability of scanning frequencies of popular CRTs. Although the particular format of bit transmission eliminates any requirement of regular inter-bit spacing, it is still necessary to provide intra-pulse timing such that a receiving device will be able to find the data-indicating or sampled portion of a pulse period in relation to its rising edge. Remember that the duration of a pulse created by a given line segment on CRT 14 depends upon the scanning frequency of the CRT. If the CRT scans at a high frequency, the pulse will be relatively short. If the CRT scans at a low frequency, the pulse will be relatively long. Thus, illuminating a given length along a CRT raster line will result in a pulse of variable duration, depending on the scanning frequency of the CRT. The time relationship of the data-indicating portion of a pulse period to its rising edge will be similarly affected.

One way to avoid the problem is to have a set-up or other procedure in the sending computer in which the computer learns, calculates, or is taught the scanning frequency of the CRT. The first or leading sub-segment of each line segment on CRT 14 can then be set to a length which is dependent on the scanning frequency to (a) ensure that the optical pulses are of a minimum duration and (b) ensure that the intermediate sub-segment(s) of the pulses will follow the rising edges by a consistent interval. However, not having to know the scanning rate of the CRT is one motivation for the invention. Accordingly, this approach is not the ideal solution.

A better way of approaching the problem is to calculate a fixed length for the leading sub-segments which will always produce an optical pulse of a minimum duration, accounting for variations in frame scanning frequencies of different graphics display devices. In the preferred embodiment, this is done by setting the first sub-segments of the line segments to a fixed fraction in length of the overall line segments, independently of the frame scanning frequency. It has been found that by setting the first sub-segments to 20% of the combined length of the first and intermediate sub-segments, there results a small time interval after the leading portion of the resulting optical pulse which can be sampled by a receiving device and which is ensured to always be within the data-indicating portions of the optical pulse.

Figure 15:
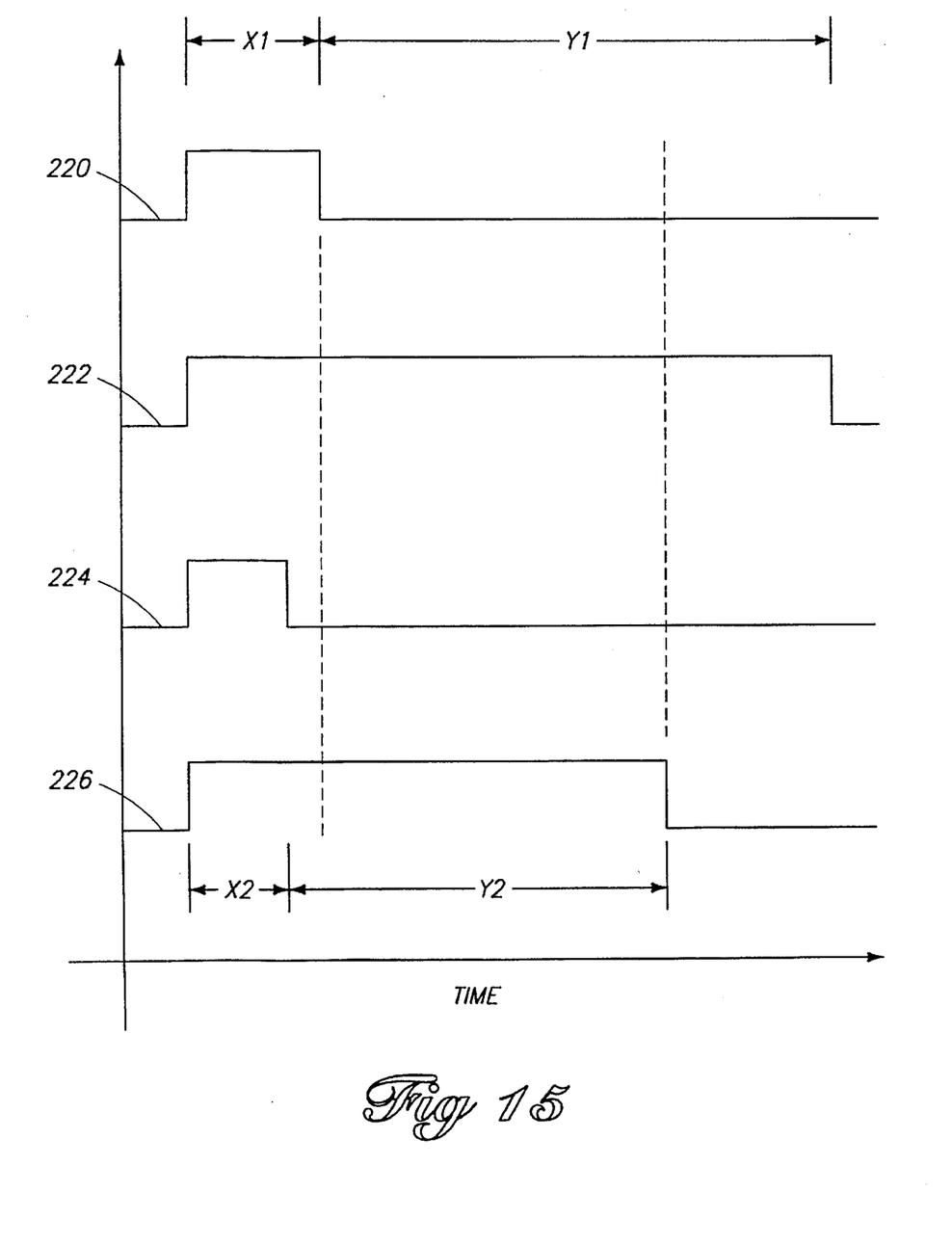
FIG. 15 is a timing diagram comparing optical pulses from CRTs having different frame scanning rates.

FIG. 15 illustrates this scheme. FIG. 15 shows a first pair of optical pulses 220 and 222 representing first and second data unit values, respectively, originating from a CRT with a 60 Hertz scanning rate. Optical pulse 220 is a short pulse and optical pulse 222 is a long pulse. A second pair of optical pulses 224 and 226 similarly represent first and second data unit values, but in a signal originating from a 80 Hertz CRT. Each set of signals is formed by the same set of illuminated raster lines on a CRT. In other words, only the frame scanning frequency is varied to produce the illustrated differences between optical pulse 220 and optical pulse 222.

There is a sampling interval, indicated by the dashed vertical lines, during which a receiving device can validly sample the optical signal and be assured that such sampling is taking place during the data-indicating portion of the potential pulse period regardless of whether the signal originates from the 60 Hertz or the 80 Hertz CRT. The beginning of this interval is measured from the rising edge of the received pulse and corresponds to the beginning of the data-indicating portion of the optical signal as it would result from the slower, 60 Hertz CRT. The ending of the interval is also measured from the rising edge of the received pulse. It corresponds to the end of the data-indicating portion of the optical signal as it would result from the faster, 80 Hertz CRT. Larger ranges of scanning frequencies can be accommodated with a corresponding reduction in the width of the sampling interval.

Many different electronic configurations can be implemented for receiving and correctly decoding optical signals in accordance with the invention, depending somewhat on the sophistication or processing power available in the receiving device. From a hardware perspective, one of the simplest implementations would be to simply monitor the output of an optical sensor with a single input line of a microprocessor, and to implement all timing and delays in software. In general terms, the portable information device would receive the optical pulses and correspond each received pulse with one of a plurality of data units to be received. It would then test or measure the duration of each optical pulse and decode the value of each data unit in accordance with the tested or measured duration of its corresponding optical pulse.

Figure 16:
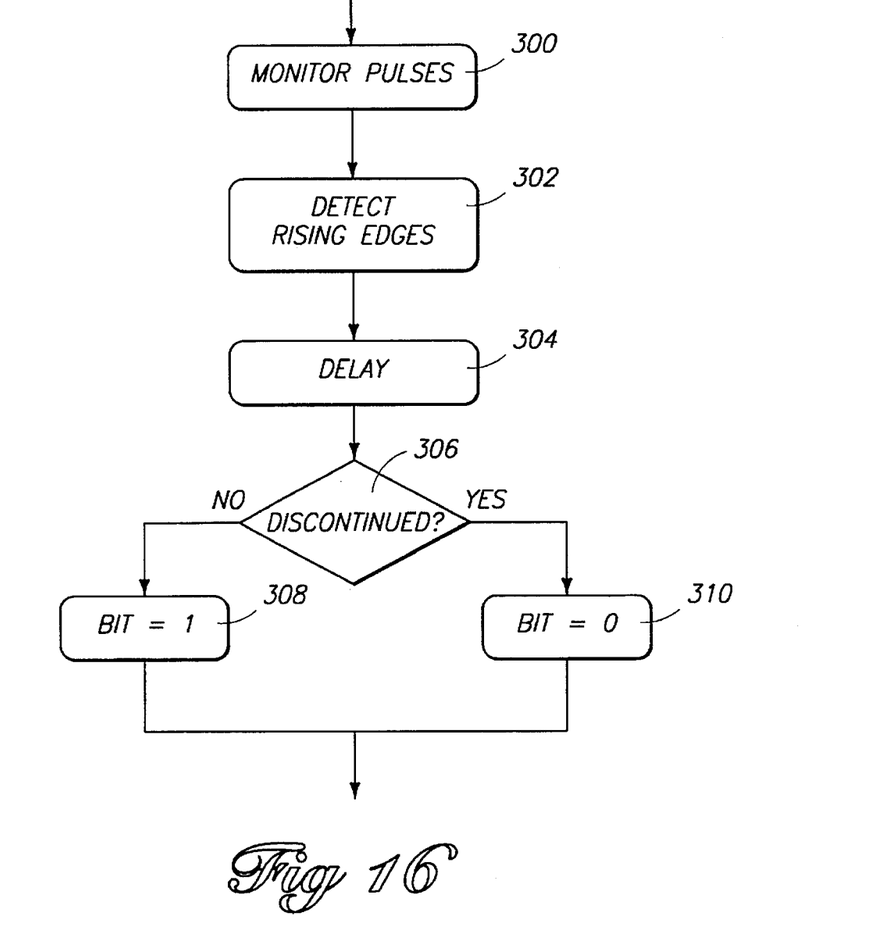
FIG. 16 is a flow chart showing preferred methodical steps of receiving data units in accordance with the invention.

FIG. 16 shows the methodical steps of the invention in more detail. Execution block 300 represents monitoring optical pulses generated by a frame-scanning graphics display device. In the preferred embodiment, this is performed in conjunction with optical sensor 13. Block 302 represents detecting the rising edges of the optical pulses. Each rising edge is interpreted as the beginning of a corresponding data unit transmission. Block 304 represents a step of waiting or delaying a first pre-defined time after detecting the rising edge of a particular optical pulse. A subsequent step 306 comprises detecting whether the particular optical pulse has been discontinued—whether the signal from the optical sensor is low or "off" after the delay. Step 308 comprises recording the data unit corresponding to the particular optical pulse as the first of the possible values only if the particular optical pulse has been discontinued after waiting the pre-defined time. Otherwise, the data unit is recorded as a second of the possible values.

In the case that more than two possible values are represented by an optical signal, a subsequent step would comprise waiting a second pre-defined time after the rising edge and then sampling the optical signal to determine whether it has been discontinued. If it has, the data unit is recorded as the second of the possible values. If not, it is recorded as a third of the possible values (step 310). Rather than sampling at a single instant, in most cases it is desirable to sample over a relatively short period to avoid the detection of noise in the signal.

Figure 17:
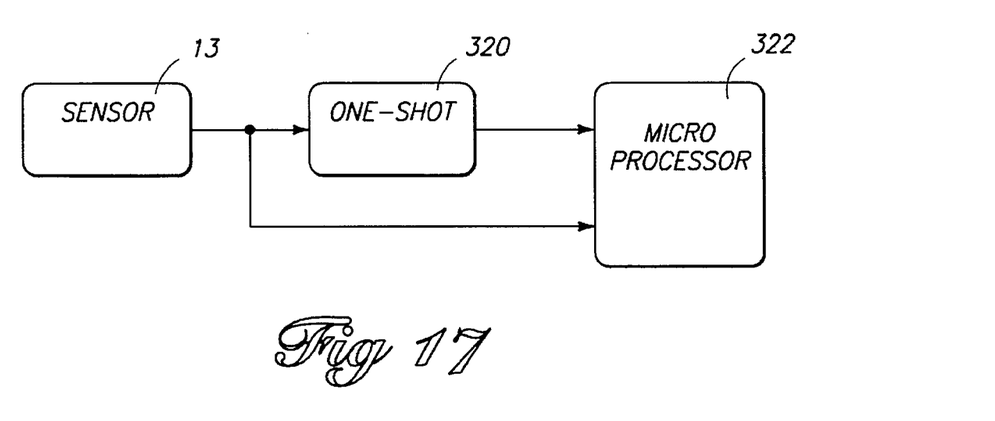
FIG. 17 is a block diagram of an exemplary circuit for receiving optical pulses generated in accordance with the invention.

If processing power in the receiving device is limited, some or many of these functions can be performed by hardware. FIG. 17 shows one possible implementation which uses a one-shot timer 320 to alert a microprocessor to appropriate times for sampling the optical pulse. Timer 320 is triggered by rising edges of the optical signal and generates responsive signals at pre-defined delays after the rising edges. The input of timer 320 is connected to the output of optical sensor 13 and the output of timer 320 is connected to an input line of a microprocessor 322. The microprocessor is also connected to read the output of the optical sensor. The microprocessor is thus relieved of timing requirements and must simply monitor the output of the timer to detect appropriate times for sampling the optical sensor.

Figure 18:
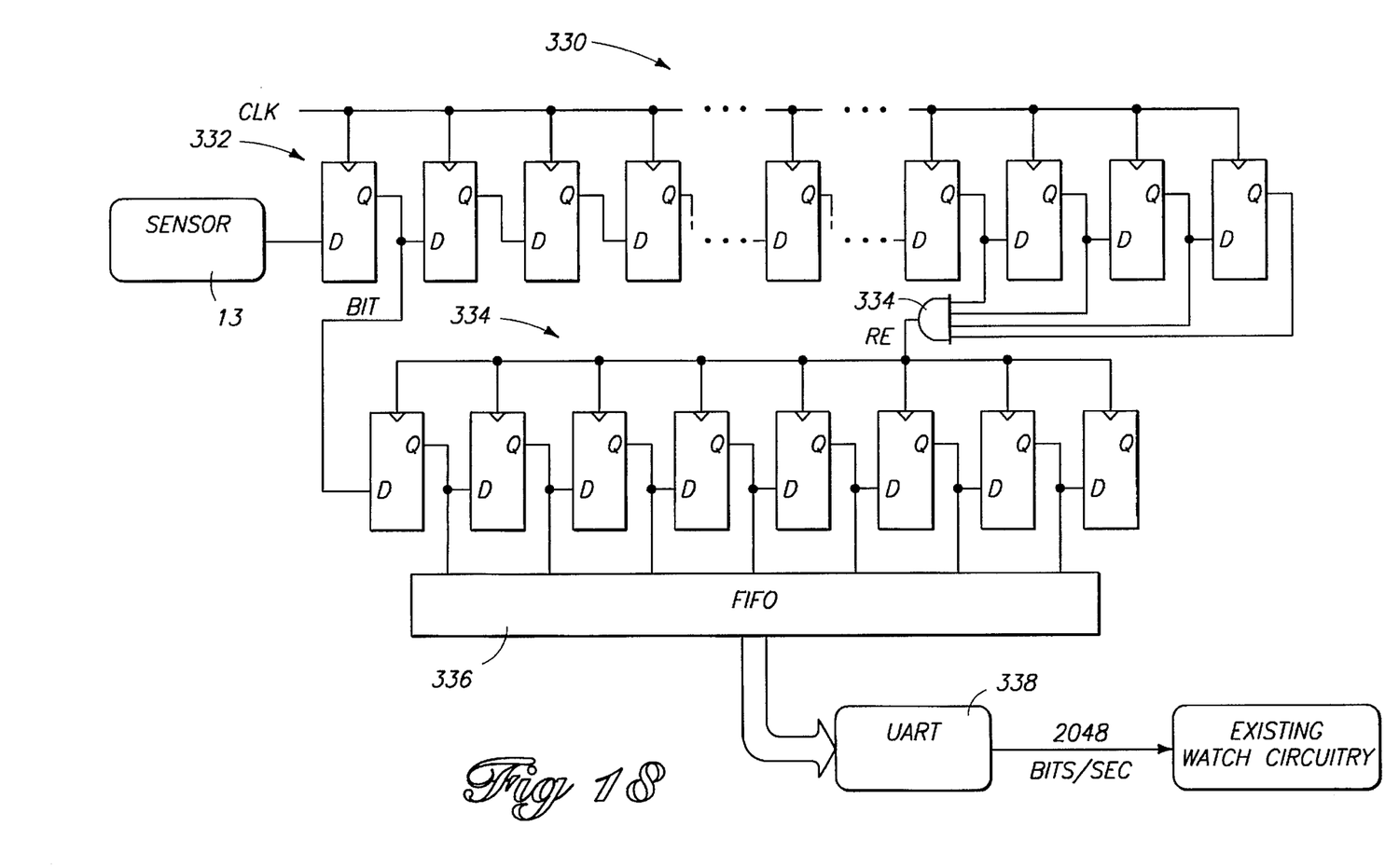
FIG. 18 is a block diagram of an alternative example of a circuit for receiving optical pulses generated in accordance with the invention

FIG. 18 shows a circuit 330 which can be used to adapt present embodiments of the Data Link™ watch to the transmission scheme described above without requiring changes in the operating software and without requiring additional I/O lines beyond those already available. Circuit 330 uses a chain of D-type flip-flops 332 which are triggered by a CLK signal at a pre-selected frequency. This frequency needs to be high enough to result in sampling each scan line about eight times. For an 80 Hz CRT, this would be about 400,000 cycles/second. The first of the chain of flip-flops has its D input connected to the optical sensor of the receiving device. Each subsequent flip-flop 332 has its D input connected to the Q output of the preceding flip-flop in the chain. At the end of the chain, the Q outputs of the last four D flip-flops are also connected to the inputs of a 4-input AND gate 334. This arrangement of flip-flops implements a shift register for maintaining a history of the state of the optical signal at discrete intervals. The output of AND gate 334 forms a signal RE which goes high to signal the reception of a rising edge when the optical signal has been high for four consecutive clock cycles. This eliminates false detections due to noise. Upon detecting a rising edge, a Q output from an early stage of the flip-flop chain can be tapped to provide a signal BIT which indicates the state of the optical signal at a fixed time interval subsequent to the rising edge.

If desired, signals RE and BIT could be monitored directly by a microprocessor to interpret data coming from a CRT. However, in the embodiment shown further manipulation is performed to put the data in a format for reception by a conventional UART such as present in the existing embodiment of the Data Link™ watch. Signal RE is used to trigger a second D-type flip-flop chain 334 consisting of individual D-type flip-flops. The input of the first flip-flop of the chain is connected to BIT. With this configuration, individual bits are clocked through the flip-flop chain and accumulated in 8-bit bytes. The bytes are clocked into a FIFO (first-in/first-out) buffer 336 and then to an output UART 338, where they are clocked out in conventional serial format at 2048 bits/second to existing watch circuitry such as to the input of the existing input UART of the Data Link™ watch. Faster rates would be possible if the watch were modified to accept such rates.

The invention is useful to eliminate the previous dependency of the Timex Data Link™ data transfer scheme on CRT scanning frequencies. This, in turn, eliminates the need for user calibration routines, allows higher data rates, and greatly simplifies operation of the Data Link™ watch.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method of serially transferring a sequence of data units to a portable information device, each data unit having one of a plurality of possible values, the method comprising the following steps:

displaying sequential display frames on a frame-scanning graphics display device;

illuminating line segments within the display frames to represent the individual data units, each such line segment having a continuous length on the display device which produces an optical pulse of a corresponding duration;

encoding each possible data unit value as a different line segment length to produce an optical pulse for each data unit having a duration which is dependent on the value of the data unit.

2. A method as recited in claim 1 and further comprising:

receiving the optical pulses with a portable information device;

determining the duration of each optical pulse;

decoding the value of each data unit in accordance with the determined duration of its optical pulse.

3. A method as recited in claim 1, the display frames each comprising a plurality of available raster lines, the method further comprising forming a plurality of the line segments from a single one of the available raster lines.

4. A method of serially transferring a sequence of data units to a portable information device, each data unit having one of a plurality of possible values, the method comprising the following steps:

displaying sequential display frames on a frame-scanning graphics display device, each display frame comprising a plurality of available raster lines;

identifying a plurality of line segments in the available raster lines, the individual line segments corresponding respectively to individual data units;

dividing each line segment into at least first and second sub-segments;

illuminating at least the first sub-segment of each line segment to produce an optical pulse of a minimum duration having a rising edge;

if a particular data unit has a first of the possible values, discontinuing the illumination of the line segment corresponding to the particular data unit during the second sub-segment of said line segment;

if the particular data unit does not have the first of the possible values, continuing to illuminate the corresponding line segment during its second sub-segment; unconditionally discontinuing the illumination after the second sub-segment of the corresponding line segment.

5. A method as recited in claim 4, the graphics display device having a frame scanning frequency, the method further comprising setting each of the first sub-segments to be a fixed fraction in length of said line segment independently of the frame scanning frequency.

6. A method as recited in claim 4, the graphics display device having a frame scanning frequency, the method further comprising setting the first sub-segments to a length which is dependent on the frame scanning frequency of the graphics display device to ensure that the optical pulses are of a minimum duration.

7. A method as recited in claim 4 and further comprising calculating a length for the first sub-segments which will produce an optical pulse of a minimum duration, said calculating accounting for variations in frame scanning frequencies of different graphics display devices.

8. A method as recited in claim 4 wherein a single one of the available raster lines has a plurality of the line segments.

9. A method as recited in claim 4 and further comprising:
   monitoring the optical pulses generated by the illuminated line sub-segments with an optical sensor of a portable information device;
   detecting the rising edges of the optical pulses;
   interpreting the rising edge of each optical pulse as the beginning of a corresponding data unit transmission;
   waiting a pre-defined time from the rising edge of a particular optical pulse;
   after waiting the pre-defined time from the rising edge, detecting whether the particular optical pulse has been discontinued;
   recording the data unit corresponding to the particular optical pulse as the first of the possible values only if the particular optical pulse has been discontinued after waiting the pre-defined time.

10. A method as recited in claim 4 and further comprising recording the data unit corresponding to the particular optical pulse as a second of the possible values if the particular optical pulse has not been discontinued after waiting the pre-defined time.

11. A method of serially transferring a sequence of data units to a portable information device, each data unit having one of a plurality of possible values, the method comprising the following steps:
   displaying sequential display frames on a frame-scanning graphics display device, each display frame comprising a plurality of available raster lines;
   identifying a plurality of line segments in the available raster lines, the individual line segments corresponding respectively to individual data units;
   dividing each line segment into leading, trailing, and intermediate sub-segments;
   illuminating at least the leading sub-segment of each line segment to produce an optical pulse of a minimum duration having a rising edge;
   if a particular data unit has a first of the possible values, discontinuing the illumination of the line segment corresponding to the particular data unit during the intermediate and trailing sub-segments of said line segment;
   if the particular data unit does not have the first of the possible values, illuminating the corresponding line segment during its intermediate sub-segment and discontinuing the illumination during the trailing sub-segment.

12. A method as recited in claim 11 wherein the dividing step comprises dividing each line segment into at least first and second intermediate sub-segments, the method further comprising:
   if a particular data unit has a first of the possible values, discontinuing the illumination of the corresponding line segment during its first intermediate sub-segment;
   if a particular data unit has a second of the possible values, discontinuing the illumination of the corresponding line segment during its second intermediate sub-segment;
   if the particular data unit does not have the first or the second of the possible values, continuing to illuminate the corresponding line segment during its first and second intermediate sub-segments.

13. A method as recited in claim 12 and further comprising:
   monitoring the optical pulses generated by the illuminated line sub-segments with an optical sensor of a portable information device;
   detecting the rising edges of the optical pulses;
   interpreting the rising edge of each optical pulse as the beginning of a corresponding data unit transmission;
   waiting a first pre-defined time from the rising edge of a particular optical pulse;
   after waiting the first pre-defined time from the rising edge, detecting whether the particular optical pulse has been discontinued;
   recording the data unit corresponding to the particular optical pulse as the first of the possible values only if the particular optical pulse has been discontinued after waiting the first pre-defined time;
   waiting a second pre-defined time after detecting the rising edge of the particular optical pulse;
   after waiting the second pre-defined time from the rising edge, detecting whether the particular optical pulse has been discontinued;
   recording the data unit corresponding to the particular optical pulse as the second of the possible values only if the particular optical pulse has been discontinued after waiting the second pre-defined time.

14. A method as recited in claim 13 and further comprising recording the data unit corresponding to the particular optical pulse as a third of the possible values if the particular optical pulse has not been discontinued after waiting the second pre-defined time.

15. A method of receiving a serial transmission of data units in a portable information device, each data unit having one of a plurality of possible values, the method comprising the following steps:
   monitoring optical pulses generated by a frame-scanning graphics display device with an optical sensor;
   detecting the rising edges of the optical pulses;
   interpreting the rising edge of each optical pulse as the beginning of a corresponding data unit transmission;
   waiting a first pre-defined time from the rising edge of a particular optical pulse;
   after waiting the first pre-defined time from the rising edge, detecting whether the particular optical pulse has been discontinued;
   recording the data unit corresponding to the particular optical pulse as a first of the possible values only if the particular optical pulse has been discontinued after waiting the first pre-defined time.

16. A method as recited in claim 15 and further comprising recording the data unit corresponding to the particular optical pulse as a second of the possible values if the particular optical pulse has not been discontinued after waiting the first pre-defined time.

17. A method as recited in claim 15 and further comprising:
waiting a second pre-defined time from the rising edge of a particular optical pulse;
after waiting the second pre-defined time from the rising edge, detecting whether the particular optical pulse has been discontinued;
recording the data unit corresponding to the particular optical pulse as a second of the possible values only if the particular optical pulse has been discontinued after waiting the second pre-defined.

18. A method as recited in claim 17 and further comprising recording the data unit corresponding to the particular optical pulse as a third of the possible values if the particular optical pulse has not been discontinued after waiting the second pre-defined time.

19. A system for serially transferring a sequence of data units to a portable information device, each data unit having one of a plurality of possible values, the system comprising:
a frame-scanning graphics display device;
means for displaying sequential display frames on the frame-scanning graphics display device;
means for illuminating line segments within the display frames to represent the individual data units, each such line segment having a continuous length on the display device which produces an optical pulse of a corresponding duration;
means for encoding each possible data unit value as different line segment length to produce an optical pulse for each data unit having a duration which is dependent on the value of the data unit.

20. A system as recited in claim 19 and further comprising:
a portable information device having an optical sensor for receiving the optical pulses;
means within the portable information device for determining the duration of each optical pulse;
means within the portable information device for decoding the value of each data unit in accordance with the determined duration of its optical pulse.

21. A system as recited in claim 19, the display frames each including a plurality of available raster lines, the system further comprising means for forming a plurality of the line segments from a single one of the available raster lines.

22. A system for serially transferring a sequence of data units to a portable information device, each data unit having one of a plurality of possible values, the system comprising:
a computer having a frame-scanning graphics display device for displaying sequential display frames, each display frame comprising a plurality of available raster lines which include a plurality of line segments correspondingly respectively to individual data units, each line segment being divided into at least first and second sub-segments;
the computer being programmed to:
illuminate at least the first sub-segment of each line segment to produce an optical pulse of a minimum duration having a rising edge;
if a particular data unit has a first of the possible values, discontinue the illumination of the corresponding line segment during its second sub-segment;
if the particular data unit does not have the first of the possible values, continue to illuminate the corresponding line segment during its second sub-segment;
unconditionally discontinue the illumination before the first sub-segment of the next line segment.

23. A system as recited in claim 22, the graphics display device having a frame scanning frequency, wherein the first sub-segments are a fixed fraction in length of the line segments, and wherein the length of the first sub-segments is independent of the frame scanning frequency.

24. A system as recited in claim 22, the graphics display device having a frame scanning frequency, wherein the first sub-segments are a length which is dependent on the frame scanning frequency of the graphics display device to minimize the duration of the optical pulses.

25. A system as recited in claim 22 wherein the computer is further programmed to calculate a length for the first sub-segments which will produce an optical pulse of a minimum duration, said calculation accounting for variations in frame scanning frequencies of different graphics display devices.

26. A system as recited in claim 22 wherein the plurality of line segments are in a single one of the available raster lines.

27. A system as recited in claim 22 and further comprising:
a portable information device having an optical sensor for receiving the optical pulses;
the portable information device having internal logic configured to:
detect the rising edges of the optical pulses;
interpret the rising edge of each optical pulse as the beginning of a corresponding data unit transmission;
wait a pre-defined time from the rising edge of a particular optical pulse;
after waiting the pre-defined time from the rising edge, detect whether the particular optical pulse has been discontinued;
record the data unit corresponding to the particular optical pulse as the first of the possible values only if the particular optical pulse has been discontinued after waiting the pre-defined time.

28. A portable information device for receiving a serial transmission of data units, each data unit having one of a plurality of possible values, comprising:
an optical sensor for monitoring optical pulses generated by a frame-scanning graphics display;
internal logic configured to:
detect rising edges of the optical pulses;
interpret the rising edge of each optical pulse as the beginning of a corresponding data unit transmission;
wait a pre-defined time from the rising edge of a particular optical pulse;
after waiting the pre-defined time from the rising edge, detect whether the particular optical pulse has been discontinued;
record the data unit corresponding to the particular optical pulse as a first of the possible values only if the particular optical pulse has been discontinued after waiting the pre-defined time.

29. A system as recited in claim 28 wherein the internal logic is further configured to record the data unit corresponding to the particular optical pulse as a second of the possible values if the particular optical pulse has not been discontinued after waiting the pre-defined time.

* * * * *